US005769119A

United States Patent [19]
Edenfield

[11] Patent Number: 5,769,119
[45] Date of Patent: Jun. 23, 1998

[54] COMBINED CONTROL AND CHECK VALVE FOR GAS TORCHES

[75] Inventor: Randy C. Edenfield, Flowery Branch, Ga.

[73] Assignee: The Lincoln Electric Company, Cleveland, Ohio

[21] Appl. No.: 722,893

[22] Filed: Sep. 27, 1996

[51] Int. Cl.[6] .................................................. E03B 65/20
[52] U.S. Cl. ...................... 137/614.2; 251/284; 251/359; 251/215
[58] Field of Search ................................ 137/614.2, 508; 251/284, 359, 215, 216, 325, 333, 332; 431/344, 345

[56] References Cited

U.S. PATENT DOCUMENTS

| | | | |
|---|---|---|---|
| 2,519,569 | 8/1950 | Hart | 137/614.2 |
| 3,354,930 | 11/1967 | Hach . | |
| 3,420,493 | 1/1969 | Kraft . | |
| 3,938,555 | 2/1976 | Swickley | 251/284 |
| 4,361,420 | 11/1982 | Bell . | |
| 4,479,511 | 10/1984 | Holland | 137/614.2 |
| 4,804,017 | 2/1989 | Knapp | 137/614.2 |
| 5,407,348 | 4/1995 | Mims et al. . | |
| 5,435,344 | 7/1995 | Robinson et al. | 137/508 |
| 5,507,438 | 4/1996 | Thomas et al. . | |
| 5,509,444 | 4/1996 | Robinson et al. | 137/508 |

FOREIGN PATENT DOCUMENTS

231970  2/1964  Austria .................................. 251/284

*Primary Examiner*—Denise L. Ferensic
*Assistant Examiner*—John Ball
*Attorney, Agent, or Firm*—Vickers, Daniels & Young

[57] ABSTRACT

A combination control valve and check valve for a gas torch is disclosed wherein a check valve is positioned within an annular control valve member downstream of a spherical control valve element with which the annular control valve member cooperates to open and close the control valve and thus the flow of gas from a source to a gas torch. The check valve protects the control valve under reverse gas flow conditions.

32 Claims, 5 Drawing Sheets

COMBINED CONTROL AND CHECK VALVE FOR GAS TORCHES

The present invention relates to the art of gas torches and, more particularly, is directed toward a valve for controlling the flow of a gas from a source to the torch and having a built-in check valve for preventing a reverse gas flow through the valve toward the source.

BACKGROUND OF THE INVENTION

In the art of gas torches, control valves are used for controlling the flow of fuel gas and oxygen to a torch from corresponding supplies. It is desired to maintain gas flow in a forward direction only, whereby a check valve is provided somewhere in the line between the supply and the control valve and which check valve will close when the gas flow reverses. Such check valves are extremely important in the gas lines of oxyacetylene welders and cutting torches in that the use of such torches, as is well known, involves combining oxygen and acetylene and igniting this mixture to produce a hot flame that can be used to preheat metal for cutting or welding. Separate valves are used to control the flow of each gas into a mixing chamber from which a combustible mixture passes to a torch tip and is ignited.

A potential problem with all such torches is flashback resulting from a backfire which can result from, for example, contacting the torch tip with the workpiece. Such a backfire causes an explosion inside the torch which, if sustained, results in flashback. Both the backfire and flashback conditions can cause a reverse flow of one or both of the fuel gas and oxygen, and such situations can damage the torch and are potentially dangerous to the torch operator and those around him. Accordingly, in an effort to preclude flashbacks from occurring, or at least to optimize resistance thereto, it is known to provide check valves in the supply lines between each of the gas sources and the corresponding control valve. When a reverse flow occurs, the check valve precludes back flow to the gas source. However, because the check valves are separate from the control valves and are not necessary for operation of the torch, situations can arise which can result in a torch being operated without one or both of the check valves in place. In this respect, for example, one or both check valves may be removed for maintenance and not replaced. When one or both check valves are omitted from the torch assembly, the aforementioned reverse flow and the problems attendant thereto are promoted. Moreover, the separate control valve and check valve arrangement is expensive from the standpoint of manufacturing costs and assembly time. Still further, the check valve is positioned upstream from the control valve with respect to the direction of flow of gas from the source, whereby the gas which flows back across the control valve to close the check valve can carry contaminates which can damage the control valve.

SUMMARY OF THE INVENTION

The present invention overcomes the foregoing and other problems and advantageously prevents fuel gas and/or oxygen from flowing in a reverse direction across the corresponding control valve. More particularly in this respect, a check valve is incorporated in the control valve and is located downstream of the flow control element of the control valve with respect to the direction of flow from the source to the torch. Accordingly, a reverse flow of gas closes the check valve to minimize back flow across the control valve, thereby protecting the control valve from damage by contaminates in the reversely flowing gas. Furthermore, by incorporating the check valve in the control valve the likelihood of omitting the check valve from the torch assembly is advantageously minimized, thus optimizing protection for the torch and operator. Moreover, the provision of physically separate control and check valves and the connection thereof at different locations in a torch assembly is advantageously avoided.

In a preferred embodiment, the invention comprises a valve housing having a control valve element therein and a control valve member supported in the housing for displacement into and out of engagement with the valve element to respectively close and open the control valve. The control valve member includes a passageway into which gas flows from the source when the control valve is open, and the check valve is supported in the passageway downstream from the entrance end thereof. The check valve is spring biased closed in the upstream direction, and the biasing force is overcome by the flow of gas when the control valve is open. However, in the event of a reverse flow, the biasing force and the pressure of the fluid flowing in the reverse direction close the check valve to prevent reverse flow across the control valve toward the source.

It is therefore an outstanding object of the present invention to provide a combination gas flow control valve and check valve arrangement for a gas burning torch.

A further object of the invention is to provide a combination control valve and check valve of the foregoing character wherein the check valve protects the control valve.

Another object of the invention is to provide a combination control valve and check valve of the foregoing character wherein the check valve closes to preclude a reverse flow condition across the control valve.

Still a further object of the invention is to provide a combination control valve and check valve of the foregoing character which is more economical to manufacture, assemble and maintain than separate control and check valves heretofore provided for gas torches.

Yet another object of the invention is to provide a combination control valve and check valve of the foregoing character which minimizes the likelihood of operating a gas torch without a check valve responsive to the back flow of gas.

Yet a further object of the invention is to provide a structurally compact combination control valve and check valve comprising a minimum number of component parts which are easy to manufacture and install.

BRIEF DESCRIPTION OF THE DRAWINGS

The foregoing and other objects of the present invention will become apparent from the following detailed description of a preferred embodiment of the invention illustrated in the accompanying drawings in which.

DETAILED DESCRIPTION OF A PREFERRED EMBODIMENT

Figure 1:
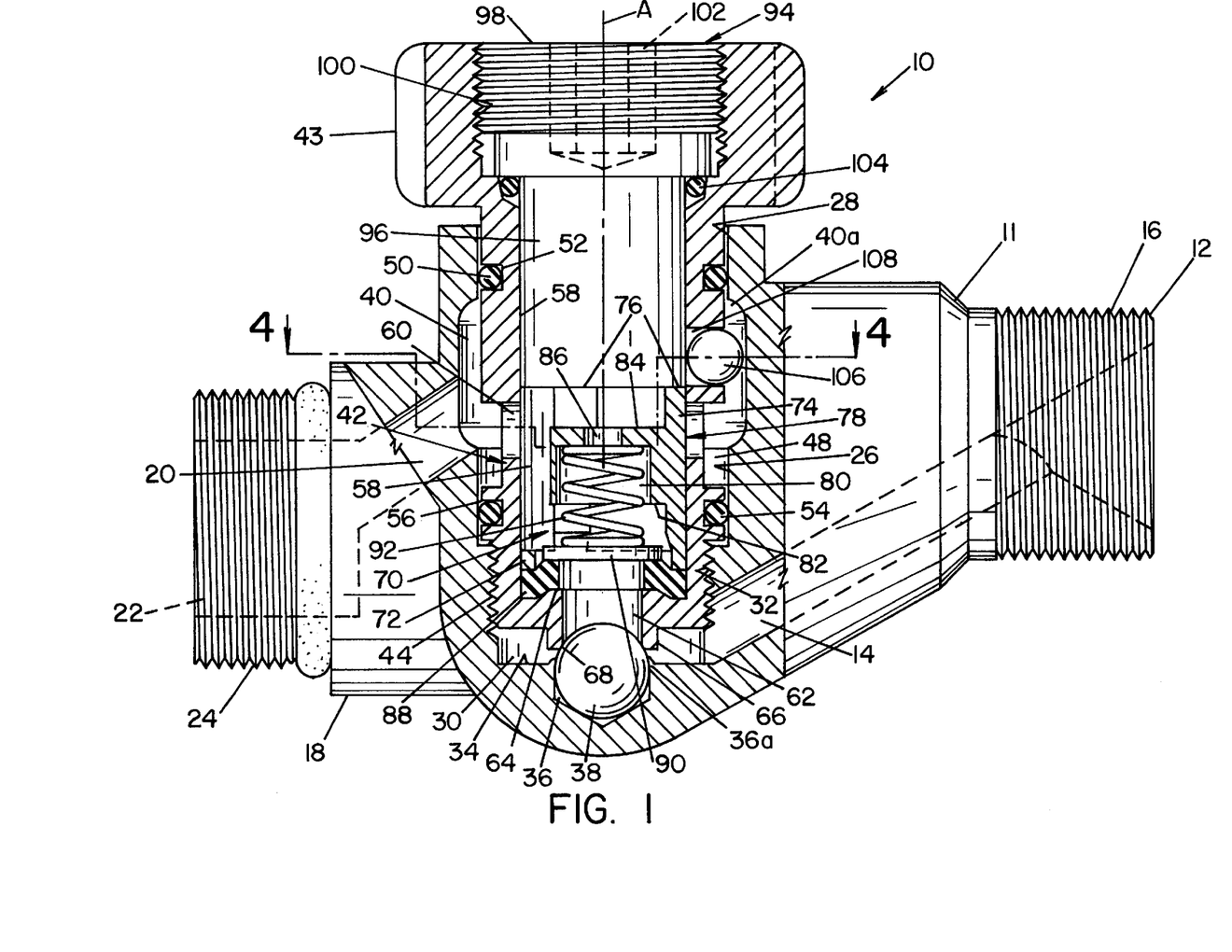
FIG. 1 is a side elevational view, partly in section, of a combination control valve and check valve according to the present invention, showing the control valve and the check valve in the closed positions.

Referring now to the drawings, wherein the showings are for purposes of illustrating a preferred embodiment of the invention only, and not for purposes of limiting the same, FIG. 1 shows a valve designated generally by the numeral 10 comprising a housing or valve body 11 including an inlet portion 12 having an inlet passage 14 and including threads 16 for connecting valve 10 to a fuel gas or oxygen supply line, not shown. Valve 10 also includes an outlet portion 18 having an outlet passage 20 opening into an outlet bore 22 and including a threaded portion 24 for connecting valve 10 to a torch. Valve housing 11 includes a bore 26 having an axis A, an axially outer end 28, an axially inner end 30, and a side wall including a threaded portion 32. Axially inner end 30 includes a bottom wall 34 and a cavity 36 in the bottom wall. A spherical ball 38 provides a control valve element coaxial with axis A, and ball 38 is retained within cavity 36 by a lip 36*a* thereof that surrounds the cavity and engages the ball above a horizontal diametrical plane there through. For the purpose set forth hereinafter, valve housing 11 is provided with a circumferentially extending recess 40 which opens radially into bore 26. Inlet passage 14 opens into inner end 30 of bore 26, and outlet passage 20 opens into the bore across recess 40.

Valve 10 further includes an annular control valve member designated generally by the numeral 42 which is received in bore 26 coaxial with axis A and includes a threaded portion 44 threadedly engaging threaded portion 32 on the side wall of the bore. The axially inner ends of valve member 42 and bore 26 cooperatively provide an inlet chamber into which inlet passage 14 opens, and the valve member is provided with an annular recess 48 cooperable with bore 26 and recess 40 to provide an outlet chamber into which outlet passage 20 opens. A first O-ring seal 50 is provided in a recess 52 in valve member 42 to form a gas tight seal between the outlet chamber and outer end 28 of bore 26, and a second O-ring seal 54 is provided in a recess 56 in valve member 42 to provide a gas tight seal between the inlet and outlet chambers. The axially outer end of valve member 42 includes an operating knob 43 by which the valve member is rotated to open and close the control valve as will become apparent hereinafter. Valve member 42 includes an interior chamber 58 that communicates with the outlet chamber as defined by recesses 40 and 48 through a plurality of radial openings 60, and the valve member further includes a passageway 62 between bottom wall 64 of chamber 58 and axially inner end 66 of the valve member. Passageway 62 is coaxial with axis A and includes an inlet and defined by an annular edge 68 which is adapted to engage and disengage spherical valve element 38 to respectively close and open the flow control valve as described in greater detail hereinafter.

Figure 4:
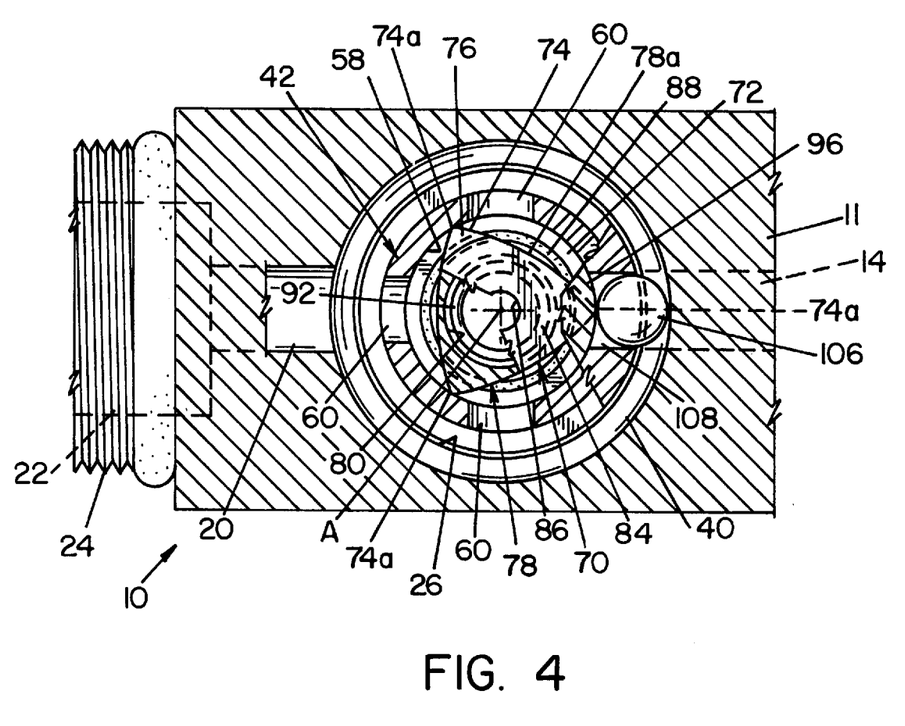
FIG. 4 is a sectional plan view of the combination valve taken along line 4—4 in FIG. 1; and, FIG. 5 is an exploded perspective view of the component parts of the combination valve.
Figure 5:
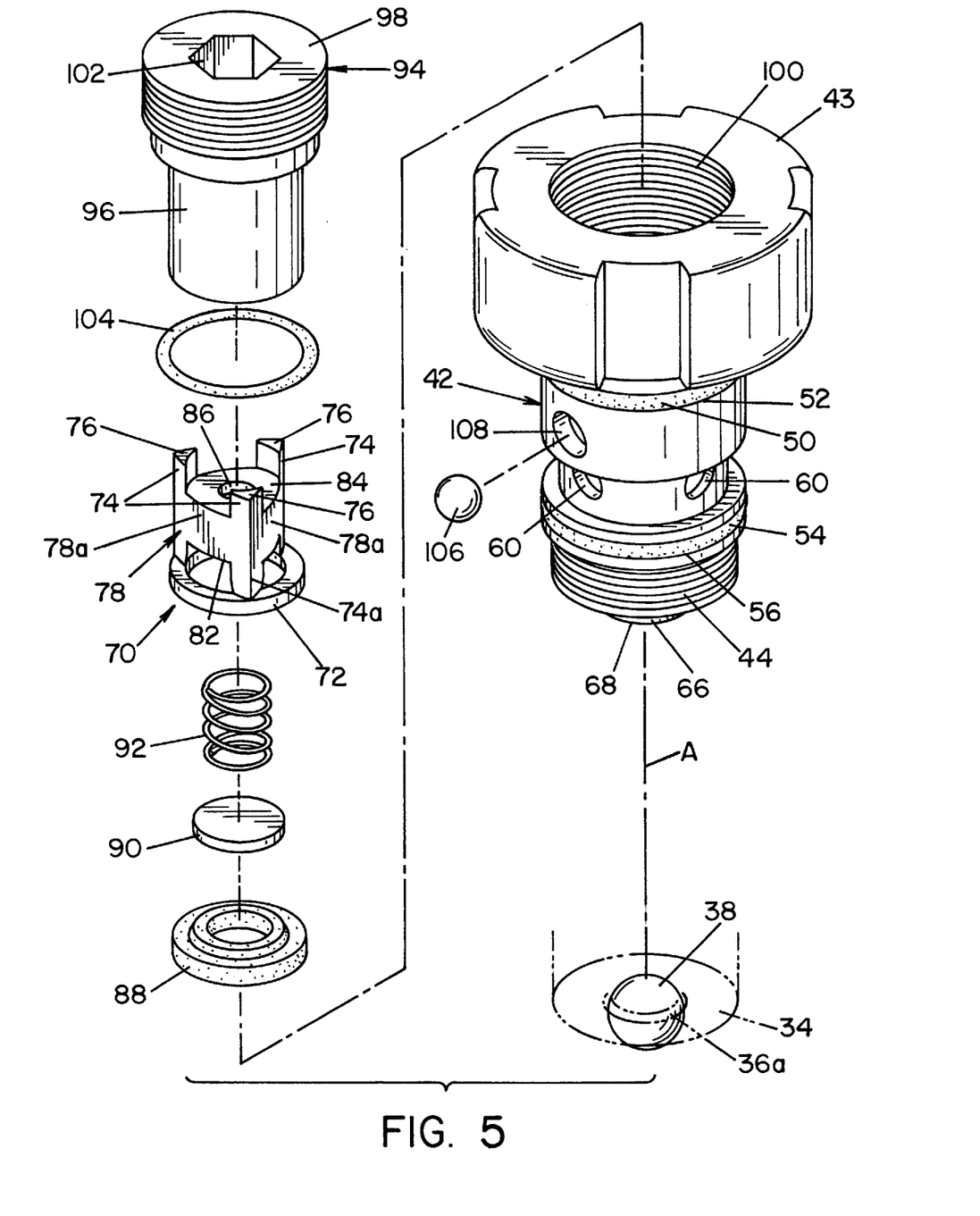

The check valve portion of valve 10 comprises a check valve housing or insert 70 which is axially slidably received in interior chamber 58 of valve member 42 and which is removably mounted therein, coaxial with axis A, as set forth hereinafter. As best seen in FIGS. 1, 4 and 5 of the drawing, insert 70 includes an axially inner end in the form of an annular ring 72 and a plurality of legs 74 integral with and extending axially outwardly from ring 72 and having axially outer ends 76. Insert 70 further includes a body portion 78 integral with legs 74 and located thereon intermediate ring 72 and outer ends 76 of the legs. The interior of body portion 78 is defined by a bore 80 which provides the body portion with an axially inner end edge 82 and an axially outer end wall 84, and end wall 84 is provided with an opening 86 therethrough which communicates bore 80 with interior chamber 58 of valve member 42 for the purpose set forth hereinafter. Legs 74 of insert 70 are equally spaced apart circumferentially about axis A and the legs and body portion have an arcuate triangular cross-sectional configuration. As best seen in FIG. 4, this configuration provides for the radially outer edges 74*a* of legs 74 to engage the wall of valve member 42 providing interior chamber 58 and provides for the arcuate sides 78*a* of body portion 78 extending between the corners 74*a* to be spaced radially inwardly from the wall providing chamber 58. Corners 74*a* engage the chamber wall to support insert 70 in coaxial relationship with axis A, and the spacing of surfaces 78*a* from the chamber wall serves the purpose which will become apparent hereinafter. The check valve further includes an annular valve seat member 88 of a suitable rubber or other resilient material which is captured between ring 72 on the inner end of insert 70 and bottom wall 64 of chamber 58. A check valve element in the form of a disk 90 is positioned between the axially inner ends of legs 74 of the insert. A spring 92 is interposed between disk 90 and end wall 84 of the insert and normally biases disk 90 into engagement with valve seat member 88 to close the check valve. As will be appreciated from FIG. 1, for example, valve seat member 88 and valve element 90 are on the downstream side of passageway 62 in valve member 42 with respect to the direction of flow of gas through passage 14 from a source of gas under pressure toward outlet passage 20 of the valve assembly.

Check valve insert 70, seat member 88, valve element 90 and spring 92 are removably mounted in chamber 58 of valve member 42 by a retaining plug 94 having a body portion 96 received in the axially outer end of chamber 58 and an axially outer end 98 threadedly interengaged with a threaded opening 100 provided therefor in the axially outer end of valve member 42 as defined by operating knob 43. Outer end 98 is provided with an axially inwardly extending tool recess 102 for receiving a tool such an allen wrench by which the plug can be rotated to achieve assembly and disassembly thereof relative to valve member 42. When assembled, as shown in FIG. 1 for example, the axially inner end of body portion 96 of plug 94 engages axially outer ends 76 of legs 74 of check valve insert 70, whereby valve seat member 88 is axially captured against the bottom wall of chamber 58 and the valve insert is axially retained in the chamber. An O-ring seal 104 is interposed between plug 94 and valve member 92 to preclude the leakage of gas from chamber 58 across the axially outer end of the plug.

Referring again to FIGS. 1–3 of the drawings and in particular to circumferentially extending recess 40 in valve housing 11, the latter recess is cooperable with a spherical ball 106 supported on valve member 42 to releasably interengage the valve member with the valve body against unintentional separation when valve member 42 is rotated in the direction to open the control valve. More particularly in this respect, valve member 42 is provided with an opening 108 extending radially therethrough and having inner and outer ends, not designated numerically, which respectively open into chamber 58 and recess 40. Ball 106 is received in opening 108 and is supported thereby for rotation with valve member 42, and a portion of ball 106 extends radially outwardly from opening 108 and into recess 40. Body portion 96 of retaining plug 94 extends axially and circumferentially across the inner end of opening 108 and positions ball 106 so as to maintain the outer end thereof in recess 40. Recess 40 has an axially outer end 40*a*, and when valve member 42 is rotated in the direction to open the control valve, ball 106 rotates therewith and progressively advances axially outwardly relative to recess 40 toward outer end 40*a* thereof. Continued rotation of valve member 42 in the opening direction carries ball 106 into engagement with end 40*a* of recess 40 to limit the opening movement and preclude unintentional separation of valve member 42 from valve housing 11.

As will be appreciated from the foregoing description, valve 10 is adapted to be readily disassembled to facilitate maintenance and/or replacement of the component parts thereof. More particularly in this respect, by removing retaining plug 94 from the outer end of valve member 42 ball 106 is released to move radially inwardly into chamber 58 and thus out of recess 40, and check valve insert 70 is simultaneously released for removal from chamber 58 together with check valve element 90, spring 92 and valve seat member 88. The release of ball 106 enables rotation of valve member 42 in the opening direction of the control valve to disengage threads 32 and 44, whereupon valve member 42 is released for withdrawal from bore 26. It will be appreciated of course that the component parts of the check valve can be removed from valve member 42 after the latter is removed from bore 26. Assembly of the component parts is likewise readily achieved by reversing the foregoing disassembly steps.

Figure 2:
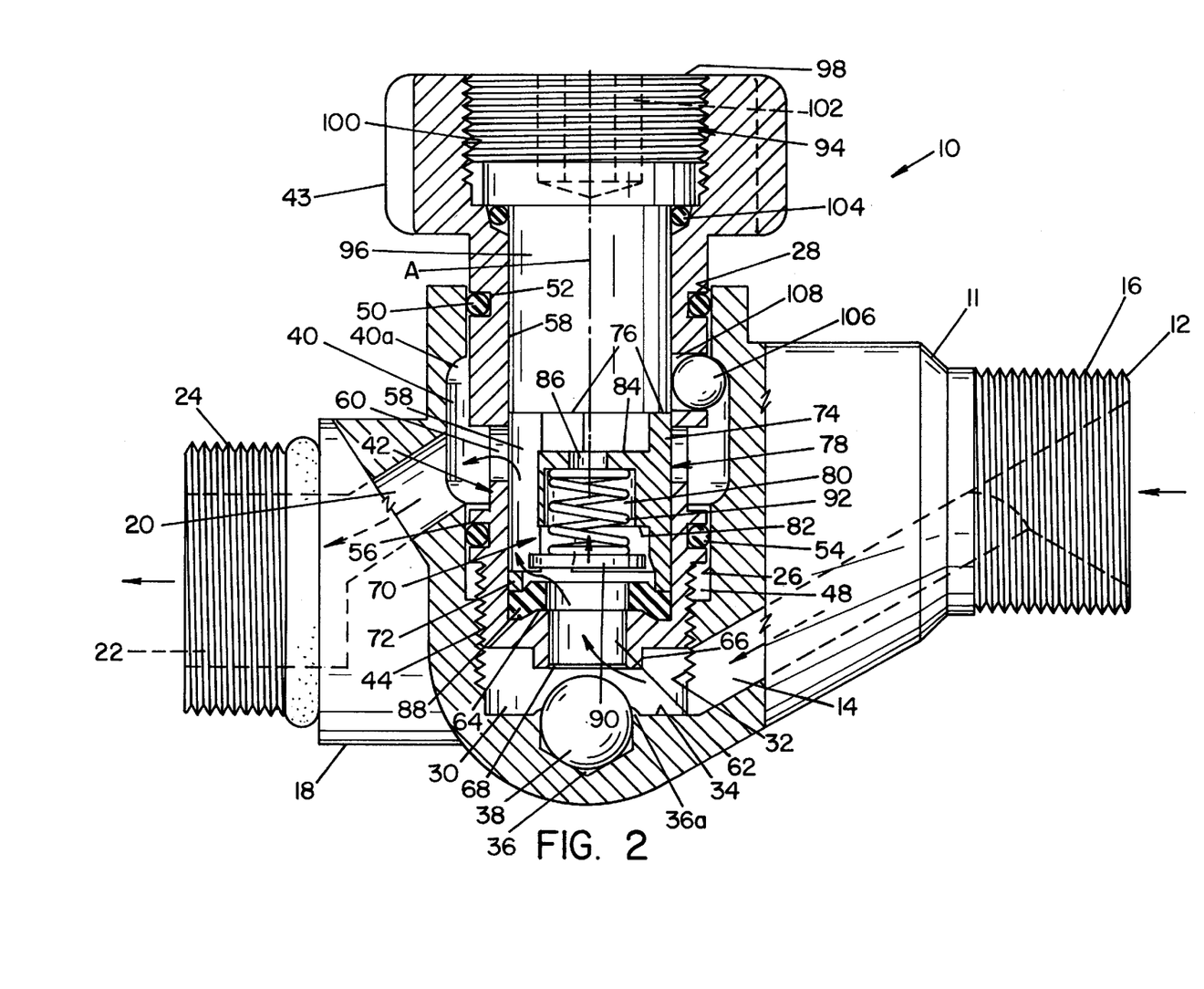
FIG. 2 is a side elevational view, partly in section, of the combination valve of FIG. 1 showing the control valve and the check valve in the open positions.

With regard to the operation of valve 10, FIG. 1 shows the control and check valves in the closed position with valve member 42 positioned in housing 11 so that edge 68 engages valve element 38 to close passageway 62 against the flow of gas thereunto from inlet passage 14. FIG. 2 shows the control valve in its open position which is achieved by rotating knob 43 to displace valve member 42 upwardly in bore 26 to move valve body 42 and thus edge 68 upwardly from control valve element 38. As seen in FIG. 2, ball 106 engages upper end 40*a* of recess 40 to limit movement of valve member 42 in the opening direction. The open position of the control valve allows gas under pressure to flow into the inlet chamber through inlet passage 14 and thence into passageway 62. The pressure of the gas in passageway 62 displaces check valve element 90 from seat member 88 against the bias of spring 92 whereupon gas flows into interior chamber 58 across the spaces between the lower ends of legs 74 of insert 70. From chamber 58 the gas flows through openings 60 into the outlet chamber defined by recesses 40 and 48 and thence into outlet passages 20 and 22 to the welding torch. During opening and closing movements of valve element 90, the lower ends of legs 74 of insert 70 laterally support the valve element and guide the axial displacement thereupon. As shown in FIG. 4, valve member 42 is preferably provided with diametrically opposed pairs of openings 60 between interior chamber 58 and recess 48. This, together with the structural configuration of check valve insert 70 advantageously communicates chamber 58 with outlet chamber 48 regardless of the orientation of insert 70 in chamber 58.

Figure 3:
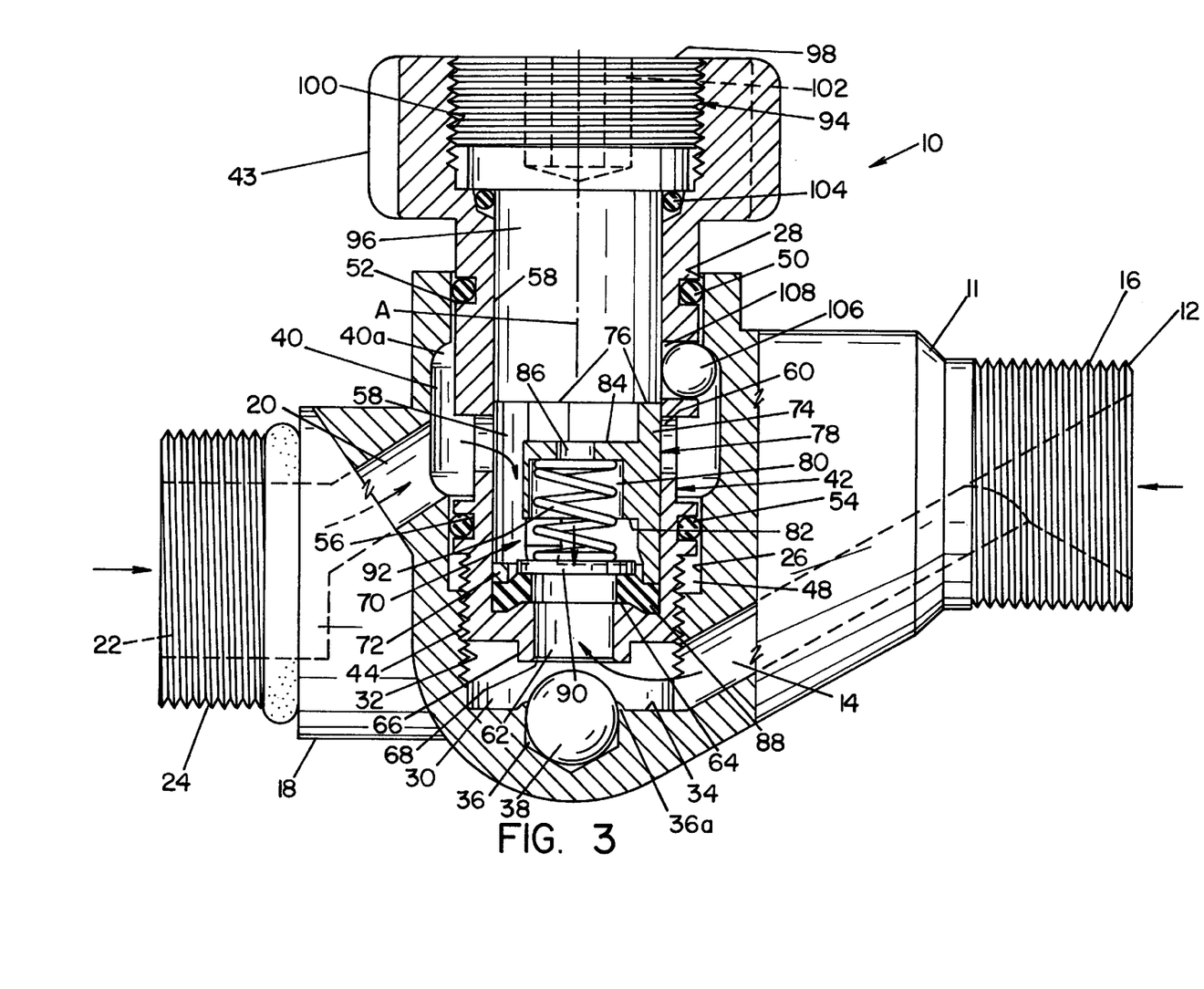
FIG. 3 is a side elevational view, partly in section, of the combination valve of FIG. 2 showing the control valve open and the check valve closed under reverse flow conditions.

FIG. 3 shows the positions of the component parts of valve 10 under a reverse gas flow condition. As can be seen from FIG. 3, the control valve is open and the pressure caused by gas flowing back into interior chamber 58 from the outlet chamber, in combination with the force of spring 92 acting against valve disk 90 forces check valve disk 90 against check valve seat 88 to preclude back flow from chamber 58 to passageway 62. Check valve disk 90 will remain in this position until the downstream pressure decreases relative to the upstream pressure at which point the check valve disk will again be forced away from check valve seat 88, allowing the flow of gas to the torch.

Importantly, because the check valve is located downstream from control valve element 38 and edge 68, the check valve also serves to protect the control valve components from any potential damage that could be caused by contaminates in the gas during a reverse gas flow condition. With further regard to FIGS. 2 and 3, if the pressure of gas flowing through the valve from the source to the torch is sufficient to open check valve disk 90 against or closely adjacent to inner end 82 of body portion 78 of insert 70, the spaces between the upper ends of legs 74 of the insert and between sides 78*b* thereof and the wall of chamber 58 provide for the gas, during reverse flow, to enter the space between end wall 84 of the insert and the inner end of plug body 96. This in turn provides for the reversely flowing gas to flow through opening 86 in end wall 84 and into bore 80 behind disk 90. The flow through opening 86 into bore 80 assures quick seating of the disk against seat member 88 and precludes the pressure of the reversely flowing gas from impinging against the underside of the disk and holding it against inner end 82 of the body portion of the insert.

While the invention has been described in connection with a preferred embodiment thereof, it will be understood that other embodiments can be devised and that such other embodiments as well as many modifications of the preferred embodiment will be obvious to one skilled in the art upon a reading and understanding of the description herein. Accordingly, it is to be understood that the foregoing descriptive matter is to be interpreted merely as illustrative of the invention and not as a limitation.

Having thus described the invention, it is claimed:

1. A combined control and check valve assembly for a gas torch comprising:

a valve housing having an inlet and an outlet for respectively connecting said housing to a source of gas under pressure and to a torch;

a control valve element mounted in said valve housing adjacent said inlet;

a valve member in said housing including a gas passageway having a first end for receiving gas through said inlet and having a second end for delivering gas to said outlet, said valve member being supported in said housing for movement relative to said control valve element for said first end to engage said valve element to close said passageway and to disengage said valve element to open said passageway, said second end of said passageway comprising check valve seat means;

a check valve element in said valve member biased against said check valve seat means in the direction toward said first end; and, operating means for moving said valve member relative to said control valve element.

2. The valve assembly of claim 1, wherein said housing and said valve member include first portions defining an inlet chamber in flow communication with to said inlet and second portions defining an outlet chamber in flow communication with said outlet.

3. The valve assembly of claim 2, wherein said control valve element comprises a metal sphere attached to said housing in said inlet chamber.

4. The valve assembly of claim 3, wherein said inlet chamber includes a wall portion having a recess therein and wherein said metal sphere is seated in said recess.

5. The valve assembly of claim 3, wherein said housing and said valve member are threadedly interengaged for rotation of said valve member to move said first end thereof toward and away from said control valve element.

6. The valve assembly of claim 5, wherein said operating means comprises a knob for rotating said valve member with respect to said housing.

7. The valve assembly of claim 3, wherein said valve member includes an interior chamber connected to said outlet chamber by at least one opening, a check valve insert in said interior chamber and supporting said check valve element, and a biasing spring in said insert biasing said check valve element against said seat means.

8. The valve assembly of claim 7, wherein said second end of said passageway opens into said insert and said insert connects said second end in flow communication with said interior chamber, and said check valve seat means comprises a check valve seat member surrounding said second end of said passageway.

9. The valve assembly of claim 8, wherein said interior chamber includes a wall surrounding said second end of said passageway and said insert engages said check valve seat member against said wall.

10. The valve assembly of claim 9, further including limiting means for limiting the movement of said valve member relative to said housing in the direction away from said control valve element.

11. The valve assembly of claim 10, wherein said limiting means includes interengaging ball and recess means between said valve housing and said valve member.

12. The valve assembly of claim 11, wherein said ball and recess means includes a recess in said valve housing and a ball on said valve member.

13. The valve assembly of claim 12, further including retaining means for releasably mounting said insert in said chamber, said ball being received in a hole therefor in said valve member and retained therein relative to said recess by said retaining means.

14. The valve assembly of claim 10, including first sealing means for forming a seal between said inlet chamber and said outlet chamber and second sealing means for forming a seal between said outlet chamber and atmosphere.

15. A gas torch valve for controlling the flow of gas in a given direction through said valve from a source of gas under pressure to a torch, comprising a valve housing having a bore, said bore having an inlet for connection to said source and an outlet for connection to said torch, a control valve element in said bore adjacent said inlet, a control valve member in said bore between said inlet and said outlet for engaging and disengaging said control valve element to respectively disconnect and connect said inlet and said outlet in flow communication, operating means for displacing said valve member into and out of engagement with said control valve element, a passageway in said valve member for communicating said inlet and said outlet when said valve member disengages said control valve element, said passageway having upstream and downstream ends with respect to the direction of flow of gas from said inlet to said outlet, a check valve seat at the downstream end of said passageway, a check valve element, and means for biasing said check valve element against said check valve seat in the direction toward said inlet.

16. A valve according to claim 15, wherein said control valve member has an end for engaging and disengaging said control valve element, said passageway opening through said end.

17. A valve according to claim 16, wherein said valve element includes a ball and said passageway includes an annular edge at said end.

18. A valve according to claim 16, wherein said control valve member includes an interior chamber, said passageway opening into said chamber, an outlet chamber between said valve housing and said control valve member in flow communication with said outlet, and said control valve member including at least one opening communicating said interior chamber with said outlet chamber.

19. A valve according to claim 18, and a check valve insert in said interior chamber on the downstream side of said check valve seat, said insert supporting said check valve element and said means for biasing said check valve element against said seat.

20. A valve according to claim 19, wherein said check valve seat includes a resilient seat member and said check valve insert includes means for holding said seat member in said interior chamber.

21. A valve according to claim 20, wherein said check valve insert has an axis, axially opposite ends, a bore coaxial with said axis and an end wall in said bore spaced from one of said ends, said one end providing said means for holding said seat member, said check valve element being adjacent to said one end, said means for biasing including a spring between said check valve element and said end wall, said insert including means providing radial openings at said opposite ends, and an opening axially through said end wall.

22. A valve according to claim 15, wherein said control valve member has an axis and said operating means axially displaces said control valve member relative to said valve housing and toward and away from said control valve element to respectively displace said valve member into and out of engagement with said control valve element, and interengaging ball and recess means between said valve housing and said control valve member for limiting displacement of said control valve member away from said control valve element.

23. A valve according to claim 22, wherein said ball and recess means includes a recess in said valve housing and a ball on said valve member.

24. A valve according to claim 23, and a check valve insert in said interior chamber on the downstream side of said check valve seat, said insert supporting said check valve element and said means for biasing said check valve element against said seat.

25. A valve according to claim 24, further including retaining means for releasably mounting said insert in said chamber, said ball being received in a hole therefor in said valve member and retained therein relative to said recess by said retaining means.

26. A valve according to claim 25, wherein said control valve member has an end for engaging and disengaging said control valve element, said passageway opens through said end, said control valve element includes a ball, and said passageway includes an annular edge at said end for engaging and disengaging said ball.

27. A valve according to claim 26, wherein said check valve seat includes a resilient seat member and said check valve insert includes means for holding said seat member in said interior chamber.

28. A combination control valve and check valve assembly for a gas torch comprising a valve housing including a bore having an axis, an open end, a closed end, a coaxial cavity in said closed end, threads in a portion of said bore between the ends thereof, an inlet opening into said closed end for connection to a source of gas under pressure, and an outlet between said closed and open ends for connection to a torch, a spherical control valve element in said cavity, an annular control valve member in and coaxial with said bore and cooperable therewith to provide an inlet chamber at said closed end and an outlet chamber communicating with said outlet, said control valve member having axially inner and outer ends and including threads engaging said threads in said bore and a knob at said outer end for rotating said control valve member with respect to said housing, said control valve member further comprising an interior chamber between said inner and outer ends and having at least one opening communicating with said outlet chamber, a passageway coaxial with said bore and extending from said interior chamber through said inner end, said passageway having an annular end edge for engaging and disengaging said control valve element to respectively close and open said passageway, a check valve seat in said interior chamber surrounding said passageway, a check valve insert in said interior chamber, a check valve element in said insert, a compression spring between said insert and said check valve element for biasing said check valve element against said check valve seat, and said check valve insert including means providing a flow path for connecting said passageway in flow communication with said at least one opening when said check valve element is displaced from said seat.

29. A valve assembly according to claim 28, wherein said valve housing includes a circumferential recess opening radially into said bore between the ends thereof, said recess having an axially outer end, a ball supported on said control valve member for rotation therewith and having a portion received in said recess for engagement with said outer end of said recess to limit rotation of said control valve member in the direction for opening said passageway.

30. A valve assembly according to claim 29, wherein said control valve member includes a radial opening therethrough to said interior chamber, said opening receiving and supporting said ball for rotation therewith, and means extending axially across said opening to radially retain said ball in said opening and said portion of said ball in said recess.

31. A valve assembly according to claim 30, further including retaining means on said control valve member for axially retaining said check valve insert in said interior chamber, said retaining means including said means extending across said opening, and said retaining means being removable from said control valve member for said ball to move into said chamber to release said control valve member for removal from said bore.

32. A valve for controlling the flow of gas to a gas torch comprising, a valve body having an inlet for connection to a source of gas under pressure and an outlet for connection to a torch, a flow control valve in said valve body between said inlet and outlet and including a gas passageway having upstream and downstream ends with respect to the direction of flow of gas from said inlet to said outlet, said flow control valve having open and closed positions respectively connecting and disconnecting said upstream end of said passageway in flow communication with said inlet, and a check valve in said gas passageway downstream from said upstream end thereof and having open and closed positions respectively opening and closing said gas passageway to the flow of gas therethrough, and spring means biasing said check valve in the direction opposite said direction to said closed position thereof.

\* \* \* \* \*